United States Patent
Rutherford et al.

[15] 3,680,091
[45] July 25, 1972

[54] PULSE TRAIN FRAMING AND INTERMEDIATE PULSE SPACING ACCURACY TEST CIRCUIT

[72] Inventors: Kenneth R. Rutherford, Cedar Rapids, Iowa; Arthur C. Strebe, St. Petersburg, Fla.

[73] Assignee: Collins Radio Company, Cedar Rapids, Iowa

[22] Filed: July 21, 1970

[21] Appl. No.: 56,901

[52] U.S. Cl. ..........................................343/6.5 R, 328/110
[51] Int. Cl. ............................................................G01s 9/56
[58] Field of Search..... 343/6.5 R, 6.5 LC; 328/110; 307/234

[56] References Cited

UNITED STATES PATENTS

| | | | |
|---|---|---|---|
| 3,040,260 | 6/1962 | Nichols | 328/110 |
| 2,975,404 | 3/1961 | Kups | 343/6.5 R |

*Primary Examiner*—Benjamin A. Borchelt
*Assistant Examiner*—G. E. Montone
*Attorney*—Richard W. Anderson and Robert J. Crawford

[57] ABSTRACT

A coded pulse train tolerance check is provided by utilizing the first of a train of input pulses to activate a timing clock pulse source. Pulses in the input train bearing a predetermined time coincidence with the clock pulses are used to set a shift register. The transfer action of the register is also under timing clock control. At the conclusion of a decoding cycle, the code word defined by the input pulse train is stored in the register only if each pulse in the input train is present and in its assigned time-space position with respect to the initial one of the input pulses.

7 Claims, 3 Drawing Figures

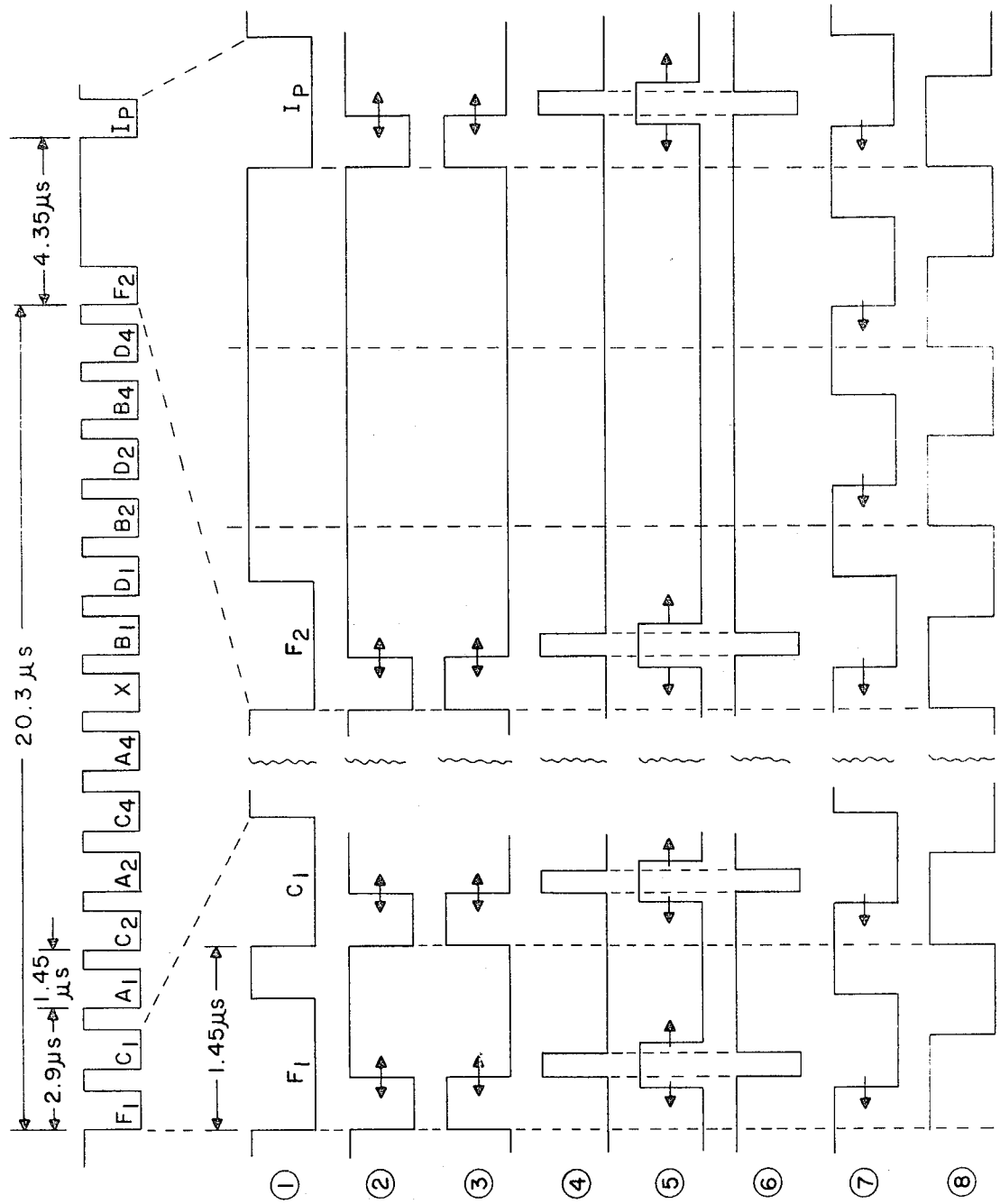

INVENTORS.
KENNETH R. RUTHERFORD
ARTHUR C. STREBE

BY  K. W. Anderson
AGENT

PULSE TRAIN FRAMING AND INTERMEDIATE PULSE SPACING ACCURACY TEST CIRCUIT

This invention relates generally to a means for checking the accuracy of the time occurrence of a predetermined train of pulses and more particularly to a means for developing a readout indicating the presence and proper pulse spacing of a train of pulses including a first pulse and a plurality of successive pulses each one of which, if present in the pulse train, is related in time to the first one of said pulses by an integral number of predetermined time intervals.

The present invention might be employed in checking the accuracy of a coded pulse train of the type generated by an aircraft transponder which, in response to valid interrogation signals from an ATC ground interrogator, generates one of a number of coded pulse train replies. The time spacing of the pulses in any one of the coded replies is utilized for purposes of identification and altitude determination by the ground interrogator and thus the ability of the airborne transponder to produce predetermined groups of pulses and to maintain an exacting time-space relationship between the pulses in terms of an integral number of time intervals is imperative to proper operation of the currently utilized ATC transponder which is the reply portion of the air traffic control (ATC) beacon radar system currently employed to locate and identify transponder equipped aircraft.

Accordingly the object of the present invention is the provision of a test circuitry which might be incorporated in a test equipment or integrated as a part of a transponder self-test function by means of which the presence and proper spacing of pulses generated in response to a selected reply code and in response to a proper ground interrogation may be determined.

While the present invention will be described with respect to its application to monitoring and determining the accuracy of ATC transponder reply pulse trains, the invention in general is applicable to determining the accuracy of any train of pulses including a first pulse and successive pulses the time occurrences of which, when present, are defined as an integral number of equal time intervals as measured from the first of the pulses in the train.

These and other features and objects of the present invention will become apparent upon reading the following description with reference to the accompanying drawings in which;

FIG. 1 is a pictorial representation of a typical pulse train corresponding to an ATC transponder reply pulse train including a full complement of pulses.

FIG. 2 is a pictorial representation of operational waveforms of a pulse train test circuitry in accordance with the present invention.

Figure 3:
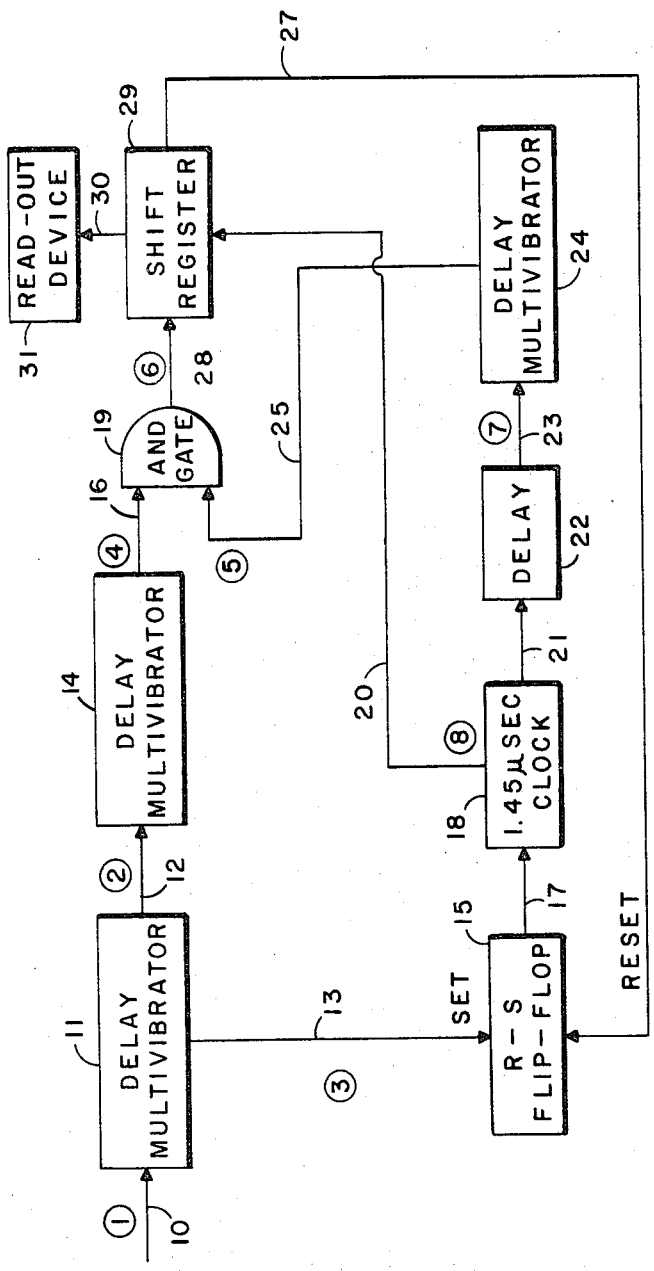
FIG. 3 is a functional block diagram of a pulse train pulse spacing accuracy test circuitry in accordance with the present invention.

FIG. 1 represents an ATC transponder reply pulse train containing a full complement of pulses. The transponder reply pulse train consists of a series of pulses, including first and last framing pulses $F_1$ and $F_2$ between which may appear in various coded permutations a number of intermediate pulses at precise time positions. The number of pulses generated in a particular reply signal is determined by the code selected. An identification pulse $I_p$ is also available and, when generated, is transmitted a predetermined time interval after the last framing pulse $F_2$. The reply pulse train always includes the first and last framing pulses $F_1$ and $F_2$ and may include any number of different permutations of intermediate pulses which, when present, must within close tolerance occupy precise time positions within the reply frame defined by the pulses $F_1$ and $F_2$.

In conventional testing arrangements for the above defined type of pulse train, the accuracy of the time occurrence of pulses is generally determined through the use of a delay line with appropriate taps followed by a decoder to compare the relative time between the initial and terminating pulses. The determination of the exact time spacing of intermediate pulses in this type of pulse train are generally not checked for pulse space accuracy due to the complexity of the circuitry required. For example, an embodiment might require a large and expensive delay line.

The present invention has the advantage of determining the accuracy of not only the initial and final pulses, such as the framing pulses $F_1$ and $F_2$ of an ATC transponder system, but, in addition, the occurrence of each intermediate pulse as measured in time with respect to the initial pulse. Furthermore, the test circuitry of the present invention accomplishes the decoding functions necessary in test devices of this type through the use of a comparatively minute time delay line thus introducing considerably less component complexity and cost while accomplishing the desired result.

The present invention accordingly utilizes successive ones of the train of input pulses to develop a train of first pulses of comparatively narrow time duration and a second train of pulses at a clock defined repetition rate which bracket the narrow pulses in time relationship. The two pulses, with time occurrences defined respectively by the incoming pulse train and clock source defining nominal pulse intervals, may be applied to a coincidence detection means the output of which is utilized to set a shift register. Pulse transfer in the register may be under clock rate control, thus the presence and proper time relationship of a predetermined coded permutation of pulses in the input train is registered or set into the shift register only if the proper time relationships exist. At the time of a complete encoding or storage of the pulse train in the shift register, and only if the pulse train is accurate in terms of pulse presence and time occurrence relative to the initial pulse, will the pulse train being decoded be reproduced in the shift register. The first framing or initial pulse in the train will thus progress through to the last stage of the shift register to generate a positive impulse which may be utilized in turning off the timing clock and concluding a decoding cycle.

The test circuitry of the present invention is functionally embodied in FIG. 3. The video pulses depicted in FIG. 3, as applied to input line 10, might be from a video amplifier as employed in known ramp test sets or generally any source of negative going impulses defining a particular permutation as to the presence or absence of a predetermined number of pulses at discrete equal time intervals within a predetermined time frame.

The input pulse train is applied to a first delay (monostable) multivibrator 11. The negative going input pulses trigger the multivibrator 11 which has an adjustable pulse width, that is, the trailing edge of the pulse developed from the monostable multivibrator is adjustable through a predetermined time range. Multivibrator 11 produces first and second complementary output pulses 12 and 13 in response to each input pulse. The negative going output pulses 12 are applied to a second delay (monostable) multivibrator 14 to produce a comparatively narrow pulse the leading edge of which is determined by the terminal edge of the pulses 12 applied thereto and the terminal edge of which is adjustable through a predetermined range. The positive going pulse output 13 from multivibrator 11 are applied as a "set" pulse to a set-reset (bistable) flip-flop 15. The resulting output 17 from flip-flop 15 starts a clock source 18.

Clock source 18, as will be further described, operates at a predetermined cyclic rate corresponding to the nominal pulse spacing between successive ones of the input pulses 10 to the system. Clock 18 provides an output 21 which is passed through a variable delay 22, so as to provide a delayed train of clock pulses 23 as a triggering input to a third monostable or delay multivibrator 24. Accordingly the leading edge of the output pulses from multivibrator 24 are determined by the leading edges of the delayed clock pulses 23. The trailing edge of the output pulses 25 from multivibrator 24 are adjustable in time. As will be further described, the delay in the clock pulse train applied to multivibrator 24, together with the adjustable pulse width permits the development of an output 25 from multivibrator 24 which may be selected to bracket the train of narrow pulses developed from multivibrator 14. Thus an output 28 from AND gate 29 occurs only when a predetermined time coincidence exists between the gating inputs 16 and 25 from the two multivibrators. The output 28 from AND gate 19 is utilized to set a shift register 29 the number of stages of which is appropriately related to the number of pulses in the input train sequence under test.

The undelayed output 20 from clock 18 is applied as a shift or transfer input to shift register 29. The negative going excursions of the undelayed output 20 from the clock 18 effect the shift and occur somewhere nominally between the time occurrence of the output pulses 28 developed in the coincidence AND gate 19 and the beginning of the next input pulse. Shift register 29 is thereby set only by those pulses of input train 10 which have the proper time relationship with respect to the initial pulse, and the initial pulse entered into shift register 29 is transferred along the successive shift register stages on each successive time occurrence of the shift pulses applied through line 20 from clock 18. In this manner the input pulse train being decoded is reproduced in shift register 29 only if the spacing of the pulses is within the accuracy set by the coincidence of input pulses 16 and 25 as applied to the AND gate 19. When the first pulse of the pulse sequence progresses through to the last stage of the shift register 29, a positive pulse from the shift register final stage is applied through line 27 as a reset pulse to flip-flop 15 which responds with an output level change on line 17 to turn off the clock 18 and conclude a decoding cycle.

In general operation, the initial one of the input train of pulses starts an accurate clock whose cyclic rate compares to the required time spacing of the pulses in the input train. The clock output, in conjunction with controlled delay multivibrators, generates a coincidence gate. Successive ones of the pulses appearing in the input train likewise initiate multivibrator pulses and are subject to a time coincidence decoding with the coincidence gates, and thus must be properly positioned within predetermined time limits, in order to be applied to the shift register. If any one of the pulses of the input train is not in proper time relationship with the initial one of the pulses in the train, it will not be applied to the shift register, and the proper code as determined by the presence or absence and time spacing of the plurality of pulses will not be stored in the shift register at the conclusion of the decoding cycle.

Output 30 from shift register as depicted in FIG. 3 might then be applied to a readout device 31 for purposes of ascertaining that the expected input code was in fact properly entered into the shift register and, in being so, was comprised of the required pulse occurrences at proper times. Thus the standard of measurement in the test arrangement of the present invention resides in the particular pulse width of the monostable multivibrators employed in conjunction with the precise time measurement established by the clock, the latter providing an accurate measurement from the occurrence of the initial pulse in the input train.

Operational waveforms are shown in FIG. 2. Waveform 1 of FIG. 2 depicts the pulse train illustrated in FIG. 1 on an expanded time basis. The time interval between successive ones of the pulses $F_1$, $C_1$, $A_1$, etc. is seen to be 1.45 microseconds. Input waveform 1 of FIG. 2 triggers monostable multivibrator 11 at the time occurrence of the negative going leading edges of successive pulses. Multivibrator 11 develops a negative output pulse 12 and a positive going output pulse 13 the time duration of which or pulse width may be adjustable between, for example, approximately 100 nanoseconds and 250 nanoseconds. Waveforms 2 and 3 of FIG. 2 illustrate the trailing edges of the output pulses 12 and 13 from multivibrator 11 as being adjustable in time. The leading edge of these pulses is time coincident with the negative going leading edge of successive pulses of the input pulse train 10 as depicted in waveform 1 of FIG. 2. The negative pulse, waveform 2, triggers monostable multivibrator 14 which has a fixed output pulse width of approximately 100 nanoseconds (waveform 4 of FIG. 2). The positive pulse output from multivibrator 11 (waveform 3 of FIG. 2) triggers the reset-set flip-flop 15 which in turn applies a start pulse on line 17 to the 1.45 microsecond clock. The clock 18 in the embodiment illustrated operates at 690 kilohertz the cyclic period of which is 1.45 microseconds (the defined nominal time spacing between successive pulses of the input pulse train). The 100-nanosecond pulse from monostable multivibrator 14 is applied through line 16 as a first input to the AND gate 19 (waveform 4, FIG. 2). The second input to the AND gate 19 is derived from the third monostable multivibrator 24 which in turn is triggered from a delayed output from the 1.45 microsecond clock 18. The clock waveform is depicted in waveform 8 of FIG. 2 while the delayed clock output is depicted in waveform 7. The leading edge of the clock output pulse may be delayed by applying the clock output pulse through line 21 to a variable delay means 22 to develop the delayed pulse 23. Thus the leading edge of the output pulse from multivibrator 24 (waveform 5 of FIG. 2) may be delayed by the particular delay established by delay means 22. The trailing edges of the output pulses from multivibrator 24 may be controlled by the delay of multivibrator 24 per se. In this manner, as depicted in waveform 5 of FIG. 2, the pulse output from multivibrator 24 can be positioned as to leading and trailing edges as required to bracket the 100-nanosecond pulse which is developed in response to each successive input pulse applied to the system.

The positive going pulse of waveform 5 is applied through line 25 as a second input to the AND gate 19 of FIG. 1 and thus if waveforms 4 and 5 of FIG. 2 are coincident, a gate output waveform 6 results which is used as an input pulse to the shift register 29 and thus denotes the presence and proper spacing of the particular pulse in the train being decoded. Shift register 29 is set by this pulse (waveform 6) and the pulse is transferred down the shift register on each successive negative excursion of the clock output waveform 8 which acts as the shift pulse to the register 29. In this regard note that the negative excursions of waveform 8 occur nominally some point in time between successive ones of the AND gate output pulses of waveform 4. Thus the AND gate output pulses set the input stage of the shift register and each of these pulses is followed by a negative excursion of the clock shift pulse input to transfer the input number down the stages of the shift register. In this manner the pulse train being decoded, whether having each of the successive ones of the pulses present or a particular permutation thereof, is reproduced in shift register 29 only if the spacing of those pulses which are actually present in the input pulse train is such to establish a coincidence output from AND gate 19.

When the first frame impulse $F_1$ of the example under discussion progresses through to the last stage of shift register 29, a positive pulse from the shift register 29 is applied through line 27 to reset the flip-flop 15, thus turning off the 1.45 microsecond clock and concluding a decoding cycle.

In the embodiment discussed herein a complete pulse train in accordance with the ATC transponder specifications comprises 18 intervals of 1.45 microseconds, thus the 1.45 microsecond clock in waveform 8 develops 19 shift pulses for application to the shift register 29 during each decoding cycle. Although a full complement of ATC reply pulse waveform is illustrated in FIG. 1, in actual practice the framing pulses $F_1$ and $F_2$ would always be present and various code permutations of the remaining pulses would be generated. Note with reference to FIG. 1 that the time interval between the negative going trailing edge of the last framing pulse $F_2$ and the negative going leading edge of the identification pulse $I_p$ is three pulse intervals, that is, 3 × 1.45 microseconds or 4.35 microseconds. The clock 18 develops an accurate train of 1.45 microsecond spaced voltage level changes used to shift the register whether or not a particular pulse is present or absent in the input pulse train. Thus in the example illustrated the shift register 29 is comprised of 19 stages and the complete pulse train will be entered therein only if each of the pulses present in the train bears the proper time of occurrence. If any one of the pulses in the input train being tested is out of time tolerance such that coincidence does not occur in AND gate 19, the shift register during the decoding cycle will not register the proper number when the cycle is concluded. Line 30 from shift register 19 is depicted in FIG. 3 as being applied to a readout device which might be comprised of any number of expedients to compare by enunciation or otherwise that the particular coded pulse train being applied had the proper number of pulses in existence at the assigned points in time during the coded cycle.

The present invention is thus seen to provide a means for checking a coded pulse train comprised of a known number of pulses the time occurrence of which must fall at precise time intervals as measured with respect to the initial one of the pulses. The utilization of each of the input pulses to generate a timing coincidence pulse for setting a shift register the shifting function of which is controlled by an accurate clock set in motion by the initial one of the pulses in the train, permits a checking of the time spacing of the first and each successive one of the number of particular pulses which are present in the input pulse train. No large time delays in the form of complicated delay lines are necessary, and the circuitry permits adjustment of tolerance by simple and straightforward means.

Although this invention has been described with respect to a particular embodiment thereof, it is not to be so limited as changes might be made therein which fall within the scope of the invention as defined in the appended claims.

We claim:

1. Means for determining the accuracy of a pulse train comprised of a first pulse and a predetermined number of successive pulses, the nominal time occurrences of said successive pulses with respect to said first pulse being integral multiples of a predetermined time interval, said means comprising a source of clock pulses the cyclic rate of which defines a time interval equal that of said predetermined time interval, means responsive to said first one of said train of input pulses to activate said clock source, means responsive to the first and successive ones of said train of input pulses to generate a first timing pulse of predetermined pulse width the time occurrence of which occurs a predetermined time interval after the initiation and within the time duration of each of said input pulses, means for generating a second timing pulse in response to successive ones of said clock pulses, the initiation of said second timing pulse occurring a predetermined period of time prior to that of nominal ones of said first timing pulses and the termination of said second timing pulse occurring a predetermined period of time after that of nominal ones of said first timing pulses, coincidence gating means receiving said first and second timing pulses, shift register means receiving the output from said coincidence gating means as setting inputs to the first stage thereof, said shift register means receiving the output from said clock source as a shift input, and means connected to the last of the stages of said shift register to deactivate said clock source upon said first pulse in said input pulse train being transferred to the last stage of said shift register, whereby said input pulse train is stored in said shift register at the completion of the aforedefined decoding cycle only upon the first and successive ones of the pulses of said input train occurring within a predetermined time tolerance of an associated integral multiple of said predetermined time interval.

2. Means as defined in claim 1 wherein said means to generate said first timing pulse comprises a first monostable multivibrator responsive to the initiation of each of said input pulses to initiate an output pulse of a predetermined time duration, a second monostable multivibrator receiving the output pulse from said first monostable multivibrator and being responsive to the trailing edge thereof to initiate an output pulse of predetermined time duration, said output pulse being applied as a first input to said coincidence gating means, said means for generating said second timing pulse comprising gating means receiving the output from said first monostable multivibrator and being activated thereby, the output of said gating means being applied to and initiating the operation of said clock means, time delay means receiving the output from said clock means and applying an output to a third monostable multivibrator, said delay means introducing a predetermined time delay, said multivibrator producing a pulse width of predetermined time duration, and the output from said third monostable multivibrator means being applied as a gating input pulse to said coincidence gating means.

3. Means as defined in claim 1 wherein said shift register comprises a plurality of stages defined as N + 1, where N is an integer defining the predetermined number of pulse intervals in said input pulse train.

4. Means as defined in claim 2 wherein said gating means comprises a bistable multivibrator, said output from said first monostable multivibrator setting said bistable multivibrator to a first conductive state, the output from the last stage of said shift register being applied to said bistable multivibrator to reset said multivibrator to a second conductive state, and said clock means being responsive to said first conductive state of said bistable multivibrator to initiate a train of timing impulses.

5. Means as defined in claim 1 further comprising readout means connected to said shift register and being responsive to the binary word entered into said shift register at the termination of said decoding cycle to indicate the proper occurrence and time spacing with respect to the first one of said input pulses in the input pulse train applied.

6. Means as defined in claim 4 further comprising readout means connected to said shift register and being responsive to the binary word entered into said shift register at the termination of said decoding cycle to indicate the proper occurrence and time spacing with respect to the first one of said input pulses in the input pulse train applied.

7. Means as defined in claim 4 wherein the trailing edges of the output pulses from said first monostable multivibrator are selectively variable in time with respect to the leading edges thereof, the trailing edge of the pulses from said second monostable multivibrator being selectively adjustable as to time occurrence with respect to the initial edges thereof, and said delay means being adapted to introduce a selectively variable time delay to said clock source pulses as applied to said third monostable multivibrator means.

* * * * *